United States Patent
Heskin et al.

(10) Patent No.: US 7,426,419 B2
(45) Date of Patent: Sep. 16, 2008

(54) SCHEDULING SYSTEM AND METHOD

(75) Inventors: James Heskin, Richardson, TX (US); Mark Shepheard, Garland, TX (US); Julia Lafoy, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 1346 days.

(21) Appl. No.: 10/640,438

(22) Filed: Aug. 13, 2003

(65) Prior Publication Data

US 2004/0093251 A1 May 13, 2004

Related U.S. Application Data

(60) Provisional application No. 60/403,089, filed on Aug. 13, 2002.

(51) Int. Cl.
- *G06F 19/00* (2006.01)
- *G06F 9/46* (2006.01)
- *G05B 19/418* (2006.01)

(52) U.S. Cl. ............ 700/101; 700/96; 700/102; 700/103; 700/111; 700/114; 700/121; 705/8

(58) Field of Classification Search ............ 700/95–97, 700/99–103, 108, 111, 112, 114, 117, 121; 705/7–9; 414/222.01, 222.02, 935, 937; 438/758, 907, 908; 702/176
See application file for complete search history.

(56) References Cited

U.S. PATENT DOCUMENTS

| | | | | |
|---|---|---|---|---|
| 4,827,423 A * | 5/1989 | Beasley et al. | ........... | 700/96 |
| 5,402,350 A * | 3/1995 | Kline | ........... | 700/101 |
| 5,442,561 A * | 8/1995 | Yoshizawa et al. | ........... | 700/100 |
| 5,444,632 A * | 8/1995 | Kline et al. | ........... | 700/100 |
| 5,751,580 A * | 5/1998 | Chi | ........... | 700/101 |
| 5,819,232 A * | 10/1998 | Shipman | ........... | 705/8 |
| 5,841,677 A * | 11/1998 | Yang et al. | ........... | 702/176 |
| 5,920,480 A * | 7/1999 | Nakamura et al. | ........... | 700/114 |
| 6,243,612 B1 * | 6/2001 | Rippenhagen et al. | ........... | 700/100 |
| 6,434,440 B1 * | 8/2002 | Teranishi et al. | ........... | 700/97 |
| 6,714,830 B2 * | 3/2004 | Browning | ........... | 700/102 |
| 6,763,277 B1 * | 7/2004 | Allen et al. | ........... | 700/100 |
| 7,043,318 B1 * | 5/2006 | Barto et al. | ........... | 700/100 |
| 7,058,587 B1 * | 6/2006 | Horne | ........... | 705/7 |
| 7,197,469 B2 * | 3/2007 | Hegde et al. | ........... | 705/8 |
| 7,283,971 B1 * | 10/2007 | Levine et al. | ........... | 705/9 |
| 2003/0171972 A1 * | 9/2003 | Heskin | ........... | 705/9 |
| 2003/0225474 A1 * | 12/2003 | Mata et al. | ........... | 700/121 |

OTHER PUBLICATIONS

Moon, J. et al., "Optimal release times in single-stage manufacturing systems with finite production inventory", Proceedings of the 41st IEEE Conference on Decision and Control, vol. 3, Dec. 10-13, 2002, pp. 2506-2511.*

(Continued)

*Primary Examiner*—Crystal Barnes-Bullock
(74) *Attorney, Agent, or Firm*—Mirna Abyad; Wade J. Brady, III; Frederick J. Telecky, Jr.

(57) ABSTRACT

Photolithography operation in a wafer fab using relative weightings of work in progress to iteratively schedule wafers.

6 Claims, 1 Drawing Sheet

OTHER PUBLICATIONS

Di Febbraro, A. et al., "Single machine scheduling with fixed lot-sizes and variable processing times", Proceedings of the 40th IEEE Conference on Decision and Control, vol. 3, Dec. 4-7, 2001, pp. 2349-2354.*

Tamaki, H. et al., "A genetic algorithm approach to multi-objective scheduling problems with earliness and tardiness penalties", Proceedings of the 1999 Congress on Evolutionary Computation, vol. 1, Jul. 6-9, 1999, pp. 46-52.*

Haibin Yu et al., "Genetic algorithm for single machine scheduling with general early-tardy penalty weights", Proceedings of the 1999 American Control Conference, vol. 2, Jun. 2-4, 1999, pp. 885-889.*

Ishizuka, H. et al., "A hierarchical scheduling system using new weight assigned function in VLSI development lines", IEEE/UCS/SEMI International Symposium on Semiconductor Manufacturing, Sep. 17-19, 1995, pp. 85-88.*

* cited by examiner

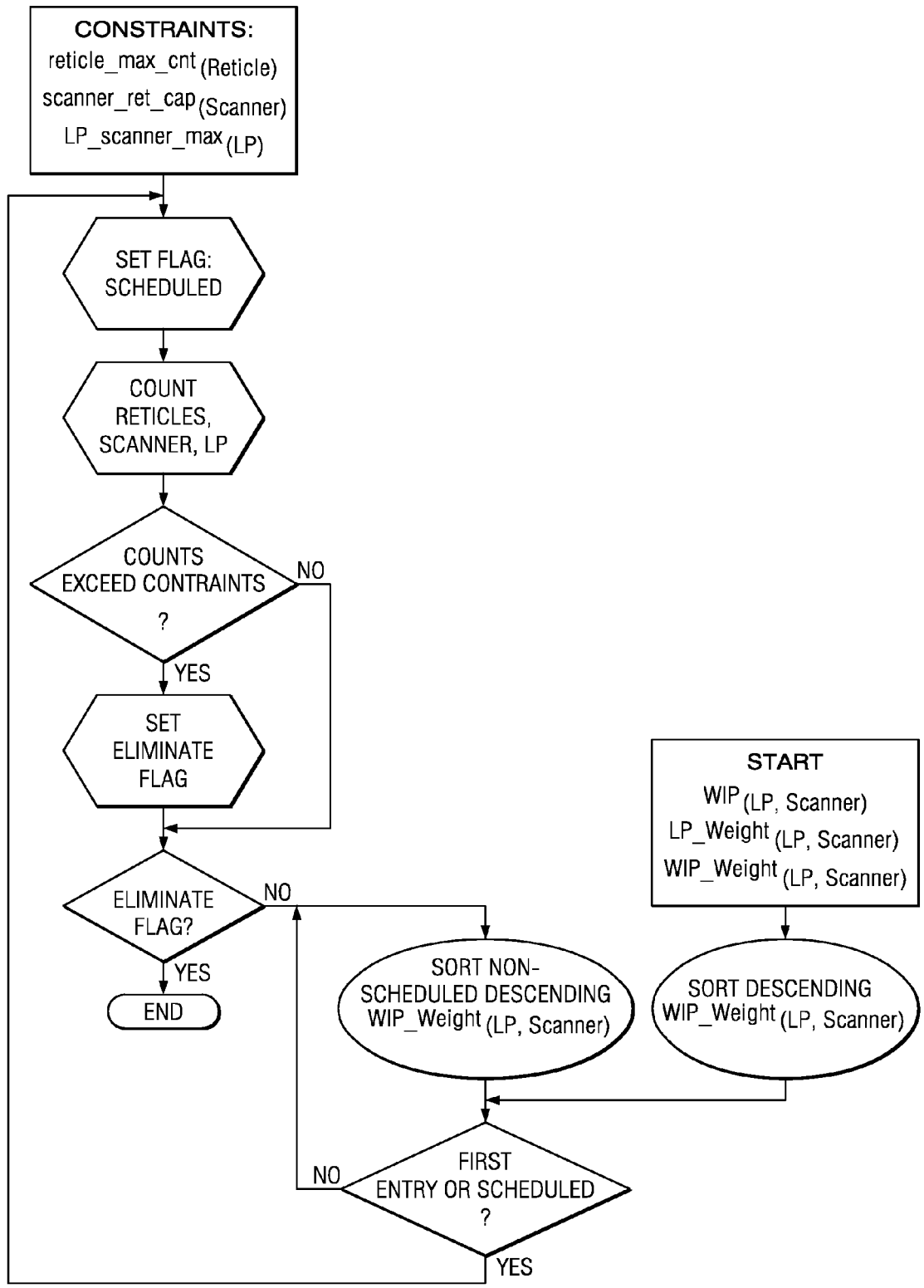

SCHEDULING SYSTEM AND METHOD

CROSS-REFERENCE TO RELATED APPLICATIONS

This application claims priority from provisional applications: Ser. No. 60/403,089, filed Aug. 13, 2002. The following patent application discloses related subject matter: Appl. Ser. No. 10/352,653, filed Jan. 28, 2003. This referenced application has a common assignee with the present application.

BACKGROUND OF THE INVENTION

The invention relates to semiconductor device manufacturing, and more particularly to scheduling photolithography in a wafer fab.

The manufacture of integrated circuit products typically involves hundreds of processing steps applied to a semiconductor (e.g., silicon) wafer over several weeks. Indeed, a typical wafer fab may at any time contain 50,000 wafers as work in progress and with a 20,000 wafer turnover per month. The basic processing operations in a wafer fab are photolithography, etching-polishing, deposition, implantation, oxidation, and diffusion-anneal plus various cleanings and inspections-measurements; and each of these processing operations has an associated set of tools. Now to yield multilevel-metal CMOS integrated circuits, a single wafer may by subject to 10-30 photolithography operations, 10-20 etching-polishing operations, 5-10 implantation operations, and so forth with these operations in multiple sequences such as photolithography-implant-anneal and deposition-photolithography-etch. Thus the sequence of processing operations (logpoints) for a single wafer is reentrant in that the same tool may be used multiple times during the wafer processing. And the problem is to schedule the wafers for processing operations, typically in lots of 25 wafers which all receive identical processing, on the tools in the fab to maximize utilization of the tools. Further, stochastic events such as tool breakdowns or varying lot priorities add to the scheduling complications.

A further complication of wafer fab scheduling arises from the simultaneous manufacture of several different integrated circuit products; each product has its own sequence of processing operations and requires its own set of reticles for use in photolithography operations. Thus despite a factory possessing several photolithography units (photoresist coaters, scanners-steppers for patterned photoresist exposure, exposed photoresist developers), the high cost of reticles and the limited reticle capacity of a scanner makes the photolithography units more like unique, mutually exclusive resources within a factory. And at any time perhaps 10% of the wafers in the fab (e.g., 5,000 wafers or 200 lots) are awaiting photolithography operation, and scheduling a particular lot at a particular logpoint for a particular scanner requires the corresponding reticle be loaded into the scanner.

Akcalt et al, Cycle-Time Improvements for Photolithography Process in Semiconductor Manufacturing, 14 IEEE Tran. Semi.Manuf. 48 (2001) describes simulations of a scheduling system with first-in/first-out dispatching.

However, the known wafer fab scheduling methods do not provide effective real time usage.

SUMMARY OF THE INVENTION

The present invention provides control of a reentrant process flow wafer fab by weighted scheduling of photolithography resources.

This has advantages of simple but effective real-time scheduling to enhance usage.

BRIEF DESCRIPTION OF THE DRAWINGS

FIG. 1 is a flow diagram for a first preferred embodiment method.

DETAILED DESCRIPTION OF THE PREFERRED EMBODIMENTS

1. Overview

The preferred embodiment methods for a wafer fab solve the problem of which scanner (or stepper) runs which reticle while also managing current inventory and production line linearity. Managing reticles appropriately is extremely important in that tool time is not wasted while requisitioning a reticle from one scanner to another causing lost production opportunity. It is also important to maintain line linearity so that the utilization of the factory's other capital is maximized, but this must be balanced against current inventory at the scanners for cycle time considerations.

The preferred embodiment methods manage all three concerns and have demonstrated to perform at near optimality with minimal computational time making them very successful in making intelligent resource management decisions. The three preferred embodiment methods have differing emphases: The first places more emphasis on maintaining fab linearity, the second places the most emphasis on reticle/inventory management, and the third is a moderate balance between the two former methods.

2. First Preferred Embodiment

Initially define the resource constraints for the method, which will also apply to the second and third preferred embodiment methods. These constraints include the number of each type of reticle in the fab (reticle_max_cnt$_{(Reticle)}$ where the subscript "reticle" denotes the independent variable), the reticle capacity of each scanner (scanner_ret_cap$_{(Scanner)}$), and the maximum number of scanners at any individual logpoint (LP_scanner_max$_{(LP)}$). Note that typical values could be as follows: reticle_max_cnt$_{(Reticle)}$ in the range 1 to 10 (a small number due to the expense of reticles with multiple reticles only for high volume products having cheap reticles); scanner_ret_cap$_{(Scanner)}$ in the range 4 to 12 (capacity equal to 12 reticles is common, but not utilizing the full capacity permits easier loading and unloading of reticles); and LP_scanner_max$_{(LP)}$ in the range 1 to 3 (for a wafer fab with 20-30 scanners, limiting the number at any particular logpoint helps spread resources over the sequence of operations for a product and avoids bunching up.

Once these constraints have been determined, the first preferred embodiment method analyzes the current inventory situation for each combination of scanner/logpoint.

First identify are all pre-pattern (process) inventories (work-in-progress) in the queue at each scanner by logpoint (WIP $_{(LP, Scanner)}$). As a simple illustrative example, a fab with 4 scanners may have lots awaiting photolithography as follows:

scanner1 WIP$_{(100,1)}$=3, WIP$_{(200,1)}$=4, WIP$_{(300,1)}$=2,
scanner2 WIP$_{(100,2)}$=3, WIP$_{(400,2)}$=5, WIP$_{(500,2)}$=2, WIP$_{(600,2)}$=4,
scanner3 WIP$_{(250,3)}$=2, WIP$_{(400,3)}$=3,
scanner4 WIP$_{(550,4)}$=1, WIP$_{(650,4)}$=1, WIP$_{(700,4)}$=5, WIP$_{(750,4)}$=1, Once these inventories have been found, each is divided by the maximum logpoint WIP for each scanner to give a relative weighting of each logpoint's WIP to the heaviest-loaded logpoint for that scanner ($LP\_Weight_{(LP,Scanner)}$). In the foregoing example, scanner1: $LP\_Weight_{(100,1)}$=0.75, $LP\_Weight_{(200,1)}$=1.0, $LP\_Weight_{(300,1)}$=0.5.

scanner2: $LP\_Weight_{(100,2)}$=0.6, $LP\_Weight_{(400,2)}$=1.0, $LP\_Weight_{(500,2)}$=0.4, $LP\_Weight_{(600,2)}$=0.8.

scanner3: $LP\_Weight_{(250,3)}$=0.67, $LP\_Weight_{(400,3)}$=1.0.

scanner4: $LP\_Weight_{(550,4)}$=0.2, $LP\_Weight_{(650,4)}$=0.2, $LP\_Weight_{(700,4)}$=1.0, $LP\_Weight_{(750,4)}$=0.2.

This logpoint weighting is then multiplied back against the WIP at each logpoint/scanner to yield a weight ($WIP\_Weight_{(LP,Scanner)}$). Again, in the foregoing example:

scanner1: $WIP\_Weight_{(100,1)}$=3*0.75=2.25, $WIP\_Weight_{(200,1)}$=4*1.0=4.0, $WIP\_Weight_{(300,1)}$=2*0.5=1.0.

scanner2: $WIP\_Weight_{(100,2)}$=3*0.6=1.8, $WIP\_Weight_{(400,2)}$=5*1.0=5.0, $WIP\_Weight_{(500,2)}$=2*0.4=0.8, $WIP\_Weight_{(600,2)}$=4*0.8=3.2.

scanner3: $WIP\_Weight_{(250,3)}$=2*0.67=1.33, $WIP\_Weight_{(400,3)}$=3*1.0=3.0, scanner4: $WIP\_Weight_{(550,4)}$=1*0.2=0.2, $WIP\_Weight_{(650,4)}$=1*0.2=0.2, $WIP\_Weight_{(700,4)}$=5*1.0=5.0, $WIP\_Weight_{(750,4)}$=1*0.2=0.2, In summary, the computations are:

$$WIP_{(LP,Scanner)} \equiv \sum_{Lot=0}^{\infty} CurrentQuantity_{(Lot,LP)}$$

$$LP\_Weight_{(LP,Scanner)} \equiv \frac{WIP_{(LP,Scanner)}}{MAX(WIP_{(Scanner)})}$$

$$WIP\_Weight_{(LP,Scanner)} \equiv WIP_{(LP,Scanner)} * LP\_Weight_{(LP,Scanner)}$$

$WIP\_Weight_{(LP,Scanner)}$ gives a relative desire to push wafers out of the logpoint while managing to generate a fair value to compare inventory loadings across scanners regardless of the total scanner inventory comparisons. Indeed, in the example, both scanner1 and scanner2 for LP=100 have WIP=4, but $WIP\_Weight_{(100,1)}$=2.25 is greater than $WIP\_Weight_{(100,2)}$=1.8 due to the heavier maximum loading of scanner2 by $WIP_{(400,2)}$. Thus the heavier maximum loading of scanner2 by LP=400 makes processing the LP=100 less desirable on scanner2 than on scanner1.

Now using these variables, the first preferred embodiment method, which emphasizes linearity, proceeds iteratively as follows (see FIG. 1). First, sort all logpoint/scanner combinations in descending order of $WIP\_Weight_{(LP,Scanner)}$. The first logpoint/scanner to be scheduled is the one at the top of the list. At this juncture, count the number of times this logpoint has been scheduled so far (=1) and the number of times that this scanner has been scheduled so far (=1) and compare these values to the corresponding constraints: $LP\_scanner\_max_{(LP)}$ and $scanner\_ret\_cap_{(Scanner)}$, respectively. If either value is equal to its constraint, all other logpoint/scanner combinations involving that constraint are eliminated from the list.

The remaining logpoint/scanner possibilities are recomputed and then again sorted in descending order of the new $WIP\_Weight_{(LP,Scanner)}$ and the process is iterated (item at the top of the list is scheduled, constraints compared, and any necessary related logpoint/scanner items eliminated) until the pool of non-eliminated $WIP_{(LP,scanner)}$'S is exhausted or all of the constraints are full. And the simplicity of the computations permits frequent re-computations to adapt to changing circumstances.

When a photolithography unit has finished operations on the lots of a scheduled $WIP_{(LP,Scanner)}$, the count of number of times that this logpoint/scanner has been scheduled is decremented by 1, so the constraints $LP\_scanner\_max_{(LP)}$ and/or $scanner\_ret\_cap_{(Scanner)}$ may become unfilled. Also, a finished lot has its LP incremented to the next LP in its process flow.

When a new lot arrives for photolithography operation, it is allocated to a scanner and becomes part of the inventory. The scanner allocation may be according to the sizes of existing scanner inventories and may also include combining with other lots which are at the same logpoint so that the same reticle can be used without transferring the reticle from one scanner to another. Also, for critical dimensions, using the same scanner for a lot as was used in a prior photolithography operation may be desired.

Again with the foregoing example, the first sorting yields a tie with $WIP\_Weight_{(400,2)}$=$WIP\_Weight_{(700,4)}$=5.0, so randomly pick $WIP\_Weight_{(400,2)}$ and schedule it (this leads to a reticle for LP=400 being loaded into scanner2). Then check the constraints $LP\_scanner\_max_{(400)}$ and $scanner\_ret\_cap_{(2)}$. If, for example, if $LP\_scanner\_max_{(400)}$=1, then eliminate $WIP\_Weight_{(400,3)}$. Next, recompute the WIP weights for the remaining considered inventories. This would again lead to $WIP\_Weight_{(700,4)}$=5.0 and it would be scheduled for scanner4, and the constraints $LP\_scanner\_max_{(700)}$ and $scanner\_ret\_cap_{(4)}$ checked for inventories to eliminate. Iterations continue scheduling until the non-eliminated inventories are all gone.

This scheduling method manages fab linearity better with lower values of $LP\_scanner\_max_{(LP)}$.

The foregoing computations are simple and can be performed frequently to dynamically adapt to lots leaving a scanner's queue (entering the processing stage) and to new lots arriving for photolithography operations.

3. Second Preferred Embodiment

The second preferred embodiment methods require another set of calculations and emphasize reticle and inventory management over fab linearity. Essentially, these methods are the same as the first preferred embodiment method except the reticle variable is added to the summation and comparison calculations. First identify are all pre-pattern (process) inventories at each scanner by reticle ($WIP_{(Reticle,Scanner)}$). Once these inventories have been found, each is divided by the maximum reticle WIP for each scanner to give a relative weighting of each reticle's WIP to the heaviest loaded reticle for that scanner ($LP\_Weight_{(Reticle,Scanner)}$). This is analogous to the first preferred embodiment method except that it is more constrained because it is calculated on the reticle/scanner instead of logpoint/scanner level. Next, multiply the value of $LP\_Weight_{(LP,Scanner,Reticle)}$ against the WIP for each reticle/scanner combination, $WIP_{(Reticle,Scanner)}$, to produce the $WIP\_Weight_{(Reticle,Scanner)}$ values. Now, the second preferred embodiment method follows the first preferred embodiment method of iteration except for addition of the $reticle\_max\_cnt_{(Reticle)}$ constraint so as to not exceed the supply of reticles. That is, proceed as follows: (i) compute and sort the $WIP\_Weight_{(Reticle,Scanner)}$ in descending order, (ii) schedule the item at the top of the sorted list, (iii) check the constraints, (iv) eliminate all items on the list which would violate constraints if scheduled; and (v) iterate (i)-(iv) with the non-eliminated and non-scheduled inventories.

In summary, the computations are:

$$WIP_{(Reticle,Scanner)} \equiv \sum_{Lot=0}^{\infty} CurrentQuantity_{(Lot,Reticle)}$$

$$LP\_Weight_{(Reticle,Scanner)} \equiv \frac{WIP_{(Reticle,Scanner)}}{MAX(WIP_{(Scanner)})}$$

$$WIP\_Weight_{(Reticle,Scanner)} \equiv WIP_{(Reticle,Scanner)} * LP\_Weight_{(Reticle,Scanner)}$$

4. Third Preferred Embodiment

The third preferred embodiment methods also require another set of calculations and emphasize reticle and inventory management over fab linearity. These methods are analogous to the second preferred embodiment methods with an additional logpoint weighting. First, identify are all pre-pattern (process) inventories at each scanner by logpoint and reticle ($WIP_{(LP,Scanner,Reticle)}$). Once these inventories have been found, each is divided by the maximum reticle/logpoint/scanner WIP. This gives a relative weighting of each reticle's WIP to the heaviest loaded reticle/logpoint for the scanner ($LP\_Weight_{(LP,Scanner, Reticle)}$). Continue analogously with foregoing methods of multiplying the LP weight by the WIP inventory, but the third preferred embodiment methods insert one intermediate step: multiply the weighting $LP\_Weight_{(LP,Scanner,Reticle)}$ value by the $LP\_Weight_{(LP,Scanner)}$ value (from the first preferred embodiment methods). This creates not only a logpoint weighting, but also a reticle weighting to each group of inventory. The resulting weighting value then multiplies the inventory $WIP_{(LP,Scanner,Reticle)}$ to produce the $WIP\_Weight_{(LP,Scanner,Reticle)}$ value. The iterative scheduling procedure follows the second (or first) preferred embodiment methods. This third preferred embodiment method can be tuned like the first preferred embodiment methods by changing the values of $LP\_scanner\_max_{(LP)}$.

The computation modified by the inserted intermediate step:

$WIP\_Weight_{(Reticle,Scanner)} \equiv WIP_{(Reticle,Scanner)} * LP\_Weight_{(Reticle,Scanner)} * LP\_Weight_{(LP,Scanner)}$

What is claimed is:

1. A method of scheduling in a wafer fab, comprising the steps of:
   (a) weighting inventories according to logpoints and photolithography units;
   (b) scheduling one of said inventories on one of said photolithography units wherein said one of said inventories has a maximum weighting from step (a);
   (c) after step (b), eliminating any of said inventories not scheduled according to constraints; and
   (d) repeating steps (a)-(c) for not-scheduled and not-eliminated ones of said inventories.

2. The method of claim 1, wherein:
   (a) said inventories of step (a) of claim 1 are denoted by the dependent variable $WIP_{(LP,scanner)}$ with the independent variable LP designating logpoint and the independent variable scanner designating photolithography unit; and
   (b) said weighting of step (a) of claim 1 is multiplication of $WIP_{(LP,scanner)}$ by the fraction $WIP_{(LP,scanner)}/max_M(WIP_{(M,scanner)})$ where $max_M(WIP_{(M,scanner)})$ denotes for each value of the scanner variable the maximum of $WIP_{(LP,scanner)}$ with respect to the LP variable.

3. A method of scheduling in a wafer fab, comprising the steps of:
   (a) weighting inventories according to reticles and photolithography units;
   (b) scheduling one of said inventories on one of said photolithography units wherein said one of said inventories has a maximum weighting from step (a);
   (c) after step (b), eliminating any of said inventories not scheduled according to constraints; and
   (d) repeating steps (a)-(c) for not-scheduled and not-eliminated ones of said inventories.

4. The method of claim 3, wherein:
   (a) said inventories of step (a) of claim 1 are denoted by the dependent variable $WIP_{(reticle,scanner)}$ with the independent variable reticle designating reticle and the independent variable scanner designating photolithography unit; and
   (b) said weighting of step (a) of claim 1 is multiplication of $WIP_{(reticle,scanner)}$ by the fraction $WIP_{(reticle,scanner)}/max_M(WIP_{(M,scanner)})$ where $max_M(WIP_{(M,scanner)})$ denotes for each value of the scanner variable the maximum of $WIP_{(reticle,scanner)}$ with respect to the reticle variable.

5. A method of scheduling in a wafer fab, comprising the steps of:
   (a) weighting inventories according to logpoints, reticles, and photolithography units;
   (b) scheduling one of said inventories on one of said photolithography units wherein said one of said inventories has a maximum weighting from step (a);
   (c) after step (b), eliminating any of said inventories not scheduled according to constraints; and
   (d) repeating steps (a)-(c) for not-scheduled and not-eliminated ones of said inventories.

6. The method of claim 5, wherein:
   (a) said inventories of step (a) of claim 1 are denoted by the dependent variable $WIP_{(LP,scanner,reticle)}$ with the independent variable LP designating logpoint, the independent variable scanner designating photolithography unit, and the independent variable reticles designating reticle; and
   (b) said weighting of step (a) of claim 1 is multiplication of $WIP_{(LP,scanner,reticle)}$ by the fractions $WIP_{(LP,scanner,reticle)}/max_M(WIP_{(M,scanner,reticle)})$ and $WIP_{(LP,scanner,reticle)}/max_M(WIP_{(LP,scanner,M)})$ where $max_M(WIP_{(M,scanner,reticle)})$ denotes for each value of the scanner and reticle variables the maximum of $WIP_{(LP,scanner,reticle)}$ with respect to the LP variable and where $max_M(WIP_{(LP,scanner,M)})$ denotes for each value of the scanner and LP variables the maximum of $WIP_{(LP,scanner,reticle)}$ with respect to the reticle variable.

* * * * *